United States Patent [19]

Weinhardt

[11] Patent Number: 4,626,764
[45] Date of Patent: Dec. 2, 1986

[54] PHOTOVOLTAIC BATTERY CHARGE CONTROLLER

[75] Inventor: Robert A. Weinhardt, Ridgecrest, Calif.

[73] Assignee: The United States of America as represented by the Secretary of the Navy, Washington, D.C.

[21] Appl. No.: 529,184

[22] Filed: Sep. 2, 1983

[51] Int. Cl.⁴ .................................................. H02J 7/00
[52] U.S. Cl. ........................................ 320/9; 136/293; 320/2; 320/40; 323/906
[58] Field of Search ........................................ 320/2-5, 320/30, 31, 9, 47, 39, 40; 136/291, 293; 363/42; 307/10 BP

[56] References Cited

U.S. PATENT DOCUMENTS

| | | | |
|---|---|---|---|
| 389,125 | 9/1888 | Weston | 322/2 X |
| 3,317,809 | 5/1967 | Bowers et al. | 320/30 |
| 3,341,842 | 9/1967 | Breguet | 340/384 |
| 3,419,779 | 12/1968 | Zehner | 320/40 X |
| 3,599,072 | 8/1971 | Becker | 320/31 |
| 3,800,207 | 3/1974 | Kott | 320/9 X |
| 3,921,049 | 11/1975 | Mellors et al. | 320/2 |
| 4,122,396 | 10/1978 | Grazier et al. | 325/492 |
| 4,136,309 | 1/1979 | Galberth et al. | 323/906 X |
| 4,243,928 | 1/1981 | Nazimek | 320/2 |
| 4,291,266 | 9/1981 | Portmann | 320/2 |
| 4,309,644 | 6/1982 | Reimers et al. | 318/139 |
| 4,383,211 | 5/1983 | Staler | 320/39 X |

FOREIGN PATENT DOCUMENTS 0034547 8/1981 European Pat. Off. ........ 307/10 BP

Primary Examiner—R. J. Hickey
Attorney, Agent, or Firm—W. Thom Skeer

[57] ABSTRACT

A voltage regulator is disclosed for a photovoltaic panel (PVP) battery charging system having a relay switch in series with a reverse current blocking diode disposed between the positive terminals of the photovoltaic panel and the battery to be charged. A variable resistor is wired in series with the coil of the relay in such manner that the voltage drop across the combination will equal the potential difference across the terminals of the battery being charged at a point in time when the normally closed relay switch will be caused to open to discontinue further charging of the battery and prevent overcharge. The reverse current blocking diode is customarily provided to prevent discharge of the battery through the PVP at night.

1 Claim, 1 Drawing Figure

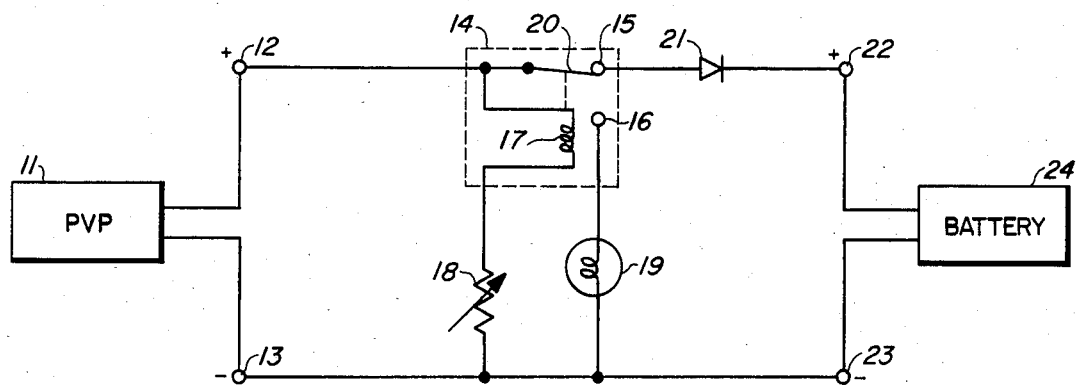

PHOTOVOLTAIC BATTERY CHARGE CONTROLLER

BACKGROUND OF INVENTION

1. Field of the Invention

The invention lies in the area of electrical circuits. More specifically, the invention discloses a voltage regulator circuit for a solar powered battery charging device. More exactly, the invention is an electrical circuit that cuts off power from a photovoltaic panel (PVP) to a battery being charged that prevents discharge of the battery through the PVP at night time, and that reinitiates battery charging the following day.

2. Description of the Prior Art

A previous method dealing with the problem of keeping a battery charged by PVP means, and not overcharging the battery in such manner that might do damage, yet preventing discharge of the battery through the PVP once the sun has set, involved use of a simple diode component situated between the PVP and the battery to be charged along with a PVP matched in size and voltage to that of the battery being charged. The diode passes current one way to the battery during the daylight charging hours and is reverse biased at night thereby preventing battery current from returning from the battery back through the PVP when the electromotive force (EMF) in the battery exceeds that of the PVP. The simple diode procedure, however, is limited to very elementary battery charging situations, and will not prevent overcharging of the batteries unless the PVP is exactly balanced to generate just that amount of electrical energy from solar energy that is used on a daily basis by the standby battery being charged.

Other more elaborate, sophisticated, and expensive devices that have been designed have used battery temperature/pressure compensation feedback means to sense the voltage level of charge in a battery during the charging process to regulate the uncontrolled PVP charging of the battery.

In addition, elaborate voltage level timing devices have been designed that use timing and battery voltage sampling intervals. In essence, these solid state devices periodically disconnect the PVP array, allow a battery voltage settling time interval for EMF battery chemical stabilization, at the end of which the battery voltage level is checked and finally reconnected to the PVP battery charger if the desired voltage is not yet obtained.

Another application dealt with a simplified voltage regulator circuit that permitted varying light intensity PVP recharging of secondary batteries. The regulator circuit electronically shunted serially connected regions of a PVP to avoid overcharging during periods of high light intensity or full battery charge conditions. The regulator circuitry provided minimal series resistance to the PVP and required nominal driving power; however, this application again is limited to relatively low current and low voltage applications.

Another prior application dealt with a dual parallel circuit extending from a PVP in which a first current limiting diode was positioned within one of said parallel circuits, and the battery to be charged was positioned within the second parallel circuit in series with a second diode. The terminals of the components of the circuit were connected such that current from the PVP was limited by the first diode means so as to prevent overcharge of the secondary battery, while the second diode means was connected so as to prevent reverse current flow through the PVP when the voltage of the secondary battery was higher than that of the PVP, i.e. when the sun sets. Again, this application is limited to low current voltage applications, and the PVP necessarily must be equally balanced with the needs of the battery to be charged.

In summary, most of the prior art devices were predominantly solid state devices, substantially more elaborate and costly than applicant's invention, and required that the PVP be matched in size with the battery being charged. As such, there exists a continuing need for a more reliable, less expensive means for controlling the charge procedure utilizing a PVP of unspecified size to charge various batteries in remote stand-by situations. The invention is substantially less expensive than other equivalent devices, it uses natural (solar) timing for charge cycles, is highly reliable, i.e. few components indicate inherent reliability, and the PVP size is independent of battery size. The invention's only limitations of any import are that it is limited to one charge cycle per day, and voltage control may vary somewhat in accuracy with respect to temperature variations.

SUMMARY OF THE INVENTION

The invention provides an inexpensive, reliable voltage regulator comprising few components, suitable for a PVP battery charging system, particularly oriented for remote environments where daylight solar energy is the energy source used to charge stand-by batteries.

A normally closed relay switch in series with a reverse current blocking diode is disposed between positive terminals of a PVP and a battery to be charged. The negative terminal of the PVP is connected directly to the negative terminal of the battery to complete the battery charging circuit. The coil of the relay switch is coupled in series with a variable resistor between the positive and negative terminals of the PVP. The variable resistor regulates the amount of charge on the battery by regulating current flow through the relay switch, thereby determining when the relay switch will be opened to break the battery charging circuit. The diode prevents battery current from passing back through the PVP at night when the sun is down, i.e. when the voltage in the battery exceeds the voltage in the PVP. An indicator light is coupled between the open position of the relay switch and the negative terminal of the PVP, thereby providing a light indicating when the relay switch is open, i.e. when the battery is not being charged.

OBJECT OF THE INVENTION

The primary object of the invention is to provide an inexpensive, reliable, battery charge control device comprising few components, suitable for a PVP charging system, particularly oriented for remote environments where daylight solar energy is utilized for the energy source to charge stand-by batteries.

Another object is to provide for a battery charge control device to be utilized in a PVP solar energy charging system that will terminate current flow to the battery when the battery becomes fully charged during a daily charge cycle, that will prevent discharge of the battery through the PVP system at night when the PVP drops to zero voltage, and that will reinitiate the daily charging cycle the following day only when the battery has dropped below a predetermined charge/voltage level.

These and other objects of the present invention will become more readily apparent from a consideration of the following specification and claims taken in conjunction with the accompanying drawings.

BRIEF DESCRIPTION OF THE DRAWINGS

The FIGURE is a schematic illustrating the voltage regulator for the PVP battery charging device.

DESCRIPTION OF THE PREFERRED EMBODIMENT

Referring now to the FIGURE, a schematic of one embodiment of the PVP battery charge controller illustrates a PVP 11 having a positive terminal 12 and a negative terminal 13. Coupled to positive terminal 12 is a relay switch 14 having a switch 20, a normally closed switch contact 15, and an open switch contact 16. A coil 17 of relay switch 14 is connected in series with a variable resistor 18 between positive terminal 12 and negative terminal 13 of PVP 11 completing a first closed circuit. Open switch contact 16 of relay switch 14 is coupled through an indicator lamp 19 to negative terminal 13 of PVP 11, thereby completing a second closed circuit between positive terminal 12 and negative terminal 13 of PVP 11 when relay switch 14 is held in the open position. A reverse current blocking diode 21 is coupled between relay switch 14 and a positive terminal 22 of a battery 24 to be charged. A negative terminal 23 of battery 24 is directly connected to negative terminal 13 of PVP 11, thereby completing a third closed circuit, the battery charging circuit, of the PVP battery charge controller.

MODE OF OPERATION

Solar energy during the day is converted to electrical energy through PVP 11 establishing an electromotive force (EMF) over positive terminal 12 and negative terminal 13 of PVP 11. During the period solar energy is received, current passes from positive terminal 12, through switch 20 normally closed contact 15 of relay switch 14, through diode 21 into positive terminal 22 of battery 24. The remaining loop for the charging circuit is completed by the current passing from negative terminal 23 of battery 24 to negative terminal 13 of PVP 11. The flow of current through cells of battery 24 causes a reverse flow of ions within the battery cells and thereby builds up a chemical charge, potential difference, to recharge the battery to its full potential.

Since coil 17 is in series with variable resistor 18, the amount of current flowing through coil 17 is effectively regulated by the resistance imposed by variable resistor 18. In addition, the voltage drop/potential difference across coil 17 and variable resistor 18 is effectively the same as the potential difference across battery terminals 22 and 23. Therefore, if battery 24 is to be charged to a certain potential difference (voltage), variable resistor 18 can be adjusted such that a sufficient amount of current is allowed to flow through coil 17 creating the requisite amount of magnetic flux to cause switch 20 of relay switch 14 to cross from the normally closed contact 15 to open contact 16, thereby opening the battery charging circuit, the third closed circuit, and preventing further charge to battery 24.

Current from PVP 11 positive terminal 12 now passes through switch 20 of relay switch 14 open contact 16, through indicator lamp 19, and thence back to negative terminal 13 of PVP 11. This current turns lamp 19 on which effectively indicates the battery is charged to full potential and no further charging of the battery is in process. The second current loop passes from PVP 11 positive terminal 12 through relay coil 17, variable resistor 18, and thence back to negative terminal 13. This constant current passing through relay coil 17 effectively maintains relay switch 14 in its open position until the sun goes down when no further solar energy is received by PVP 11 and no EMF is produced across terminals 12 and 13.

As the sun sets, solar energy received by PVP 11 is essentially nil, resulting in essentially zero EMF across PVP terminals 12 and 13. The lack of current flow through coil 17 collapses the magnetic flux field and enables switch 20 to fall back to its normally closed contact 15. Since the potential difference/EMF across terminals 22 and 23 of battery 24 is now greater than the zero EMF across terminals 12 and 13 of PVP 11, current will tend to reverse its previous flow and pass back from battery 24 to PVP 11 at night when the sun is down. This reverse current flow that would effectively discharge battery 24 at night is prevented by reverse current blocking diode 21.

As the sun rises again the following day, solar energy received by PVP 11 again establishes an EMF across terminals 12 and 13 of PVP 11, thereby reestablishing the above described battery charging process.

While the invention has been described with reference to a specific embodiment, it will be apparent to those skilled in the art that various changes and modifications can be made to the specific embodiment as shown and described without departing from the spirit and scope of the invention as set forth in the following claims.

What is claimed is:

1. A photo voltaic panel (PVP) battery charging device, comprising:
    a PVP having positive and negative terminals; a relay coil coupled across said positive and negative terminals of said PVP;
    a variable resistor coupled across said positive and negative terminals of said PVP in series with said relay coil;
    a positive and a negative battery connecting terminals, said positive battery terminal being coupled to said positive PVP terminal, and said negative battery terminal being coupled to said negative PVP terminal;
    a normally closed relay switch operated upon by said relay coil and coupled between said positive PVP terminal and said positive battery terminal; and
    a forward biased diode coupled between said positive PVP terminal and said positive battery terminal in series with said relay switch between said relay switch and said positive battery terminal.

* * * * *